(12) United States Patent
Toshchakov et al.

(10) Patent No.: US 11,086,948 B2
(45) Date of Patent: Aug. 10, 2021

(54) METHOD AND SYSTEM FOR DETERMINING ABNORMAL CROWD-SOURCED LABEL

(71) Applicant: YANDEX EUROPE AG, Lucerne (CH)

(72) Inventors: Aleksey Vasilevich Toshchakov, Vologda (RU); Anastasiya Leonidovna Posadskaya, Moscow (RU); Alexander Vladimirovich Anisimov, Zhukovskiy (RU); Evgeniya Vladimirovna Aglinskaya, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 16/868,363

(22) Filed: May 6, 2020

(65) Prior Publication Data

US 2021/0056145 A1 Feb. 25, 2021

(30) Foreign Application Priority Data

Aug. 22, 2019 (RU) .......................... RU2019126515

(51) Int. Cl.
*G06F 16/951* (2019.01)
*G06F 16/957* (2019.01)
(Continued)

(52) U.S. Cl.
CPC ........ *G06F 16/951* (2019.01); *G06F 11/3438* (2013.01); *G06F 16/9574* (2019.01); *G06N 20/00* (2019.01)

(58) Field of Classification Search
CPC .................................................. G06F 16/951
See application file for complete search history.

(56) References Cited

U.S. PATENT DOCUMENTS 7,519,562 B1 4/2009 Vander et al.
7,610,276 B2 10/2009 Yomtobian
(Continued)

FOREIGN PATENT DOCUMENTS

CN 103853744 A 6/2014

OTHER PUBLICATIONS

"Search Engine Click Spam Detection Based on Bipartite Graph Propagation" http://www.thuir.cn/group/~YQLiu/publications/wsdm2014.pdf, published in WSDM '14 Proceedings of the 7th ACM international conference on Web search and data mining on Feb. 24, 2014, retrieved on Oct. 9, 2019.
(Continued)

*Primary Examiner* — James J Debrow
(74) *Attorney, Agent, or Firm* — BCF LLP

(57) ABSTRACT

Systems and methods for determining an abnormal crowd-sourced label for a digital item comprising: analyzing a portion of the plurality of crowd-sourced labels, determining an abnormal subset of crowd-sourced labels having been potentially caused by an occurrence of the external trigger event, acquiring a browsing history associated with a subset of the plurality of users, separating the browsing history into a first browsing history group and a second browsing history group associated, generating a delta set of web resources based on analyzing the first browsing history group and the second browsing history group for differences in web resources visited by the subset of the plurality of users, the delta set containing at least one web resource of the first browsing history set being associated with an abnormal pattern of visits, associating the at least one web resource as being a source of the external trigger event.

20 Claims, 15 Drawing Sheets

(51) Int. Cl.
 *G06F 11/34* (2006.01)
 *G06N 20/00* (2019.01)

(56) References Cited

U.S. PATENT DOCUMENTS

| | | | |
|---|---|---|---|
| 7,827,054 | B2 | 11/2010 | Campbell et al. |
| 7,877,800 | B1 | 1/2011 | Satish et al. |
| 8,578,462 | B2 | 11/2013 | Petrovic |
| 8,661,299 | B1 | 2/2014 | Ip |
| 8,966,631 | B2 | 2/2015 | El-Moussa et al. |
| 9,047,628 | B2 | 6/2015 | Mislove et al. |
| 9,092,510 | B1 | 7/2015 | Stets et al. |
| 9,183,387 | B1 | 11/2015 | Altman et al. |
| 9,241,010 | B1 | 1/2016 | Bennett et al. |
| 9,349,134 | B1 | 5/2016 | Adams et al. |
| 9,479,516 | B2 | 10/2016 | Mote et al. |
| 9,652,354 | B2 | 5/2017 | Filimonov et al. |
| 9,672,242 | B2 | 6/2017 | Jung et al. |
| 9,846,896 | B2 | 12/2017 | Shah et al. |
| 9,866,566 | B2 | 1/2018 | Dulkin et al. |
| 9,870,596 | B2 | 1/2018 | Babinowich et al. |
| 10,009,358 | B1 | 6/2018 | Xie et al. |
| 10,084,816 | B2 | 9/2018 | Zhang et al. |
| 10,089,660 | B2 | 10/2018 | Luan et al. |
| 10,218,733 | B1 | 2/2019 | Amidon et al. |
| 2005/0262026 | A1 | 11/2005 | Watkins et al. |
| 2008/0162475 | A1 | 7/2008 | Meggs et al. |
| 2008/0172271 | A1 | 7/2008 | Wee et al. |
| 2008/0301090 | A1 | 12/2008 | Sadagopan et al. |
| 2008/0301811 | A1 | 12/2008 | Jung |
| 2009/0049547 | A1 | 2/2009 | Fan |
| 2009/0083184 | A1 | 3/2009 | Eisen et al. |
| 2011/0055104 | A1 | 3/2011 | Sun et al. |
| 2011/0208714 | A1 | 8/2011 | Soukal et al. |
| 2012/0233692 | A1 | 10/2012 | Oh et al. |
| 2013/0332468 | A1 | 12/2013 | Hardas et al. |
| 2014/0114877 | A1 | 4/2014 | Montano |
| 2014/0214570 | A1 | 7/2014 | Smolev et al. |
| 2015/0205862 | A1 | 7/2015 | Campagne et al. |
| 2015/0264073 | A1 | 9/2015 | Tavakoli et al. |
| 2015/0326674 | A1 | 11/2015 | Kruglick et al. |
| 2015/0341383 | A1 | 11/2015 | Reddy et al. |
| 2016/0065600 | A1 | 3/2016 | Lee et al. |
| 2016/0196566 | A1 | 7/2016 | Murali et al. |
| 2016/0259742 | A1 | 9/2016 | Faulkner et al. |
| 2016/0321711 | A1* | 11/2016 | Wouhaybi et al. ..... G06Q 30/02 |
| 2017/0220971 | A1 | 8/2017 | Giammaria et al. |
| 2017/0221111 | A1 | 8/2017 | Salehi et al. |
| 2017/0230229 | A1 | 8/2017 | Sasturkar et al. |
| 2017/0272458 | A1 | 9/2017 | Muddu et al. |
| 2018/0048658 | A1 | 2/2018 | Hittel et al. |
| 2018/0196684 | A1 | 7/2018 | Pengfei et al. |
| 2018/0218295 | A1 | 8/2018 | Hasija et al. |
| 2018/0278647 | A1 | 9/2018 | Gabaev et al. |
| 2018/0357683 | A1* | 12/2018 | Pickover et al. ...... G06Q 30/02 |
| 2019/0034986 | A1 | 1/2019 | Robinson et al. |
| 2019/0379700 | A1 | 12/2019 | Canzanese et al. |
| 2020/0012981 | A1 | 1/2020 | Davison et al. |
| 2020/0311309 | A1 | 10/2020 | Dawer et al. |
| 2020/0342006 | A1 | 10/2020 | Rossi et al. |

OTHER PUBLICATIONS

Walgampaya "Cracking the Smart ClickBot", Conference: 13th IEEE International Symposium on Web Systems Evolution, WSE 2011, Williamsburg, VA, USA, Sep. 30, 2011 Cite this publication, DOI: 10.1109/WSE.2011.6081830 , retrieved on Oct. 9, 2019.
Yafeng "Positive Unlabeled Learning for Deceptive Reviews Detection", Wuhan University, published in Proceedings of the 2014 Conference on Empirical Methods in Natural Language Processing (EMNLP), retrieved on Oct. 9, 2019.
Office Action dated May 13, 2021 received in respect of a related U.S. Appl. No. 16/869,878.
Notice of Allowance dated Jun. 24, 2021 received in respect of a related U.S. Appl. No. 16/869,282.

* cited by examiner

| Label: | 1 | 2 | 3 | 4 | 5 | 6 | 7 | 8 | 9 | 10 |
|---|---|---|---|---|---|---|---|---|---|---|
| Number: | 10 | 20 | 30 | 35 | 40 | 40 | 40 | 35 | 30 | 5 |

FIG. 5

Browsing History Data 1100

| No. | Set of URLs 1102 | Access time 1104 |
|---|---|---|
| 1 | www.aaaa.com | 2019-07-20 10:24:45 |
| 2 | www.bbbb.com | 2019-07-20 12:34:58 |
| 3 | www.cccc.com | 2019-07-20 14:10:15 |
| 4 | www.dddd.com | 2019-07-20 14:18:27 |
| 5 | www.eeee.com | 2019-07-20 15:11:19 |
| 6 | www.ffff.com | 2019-07-20 17:21:51 |
| 7 | www.gggg.com | 2019-07-20 19:32:44 |
| 8 | www.hhhh.com | 2019-07-20 21:08:14 |
| 9 | www.iiii.com | 2019-07-20 23:17:25 |
| 10 | www.jjjj.com | 2019-07-21 11:20:47 |
| 11 | www.kkkk.com | 2019-07-20 13:44:35 |
| 12 | www.llll.com | 2019-07-20 15:25:41 |
| 13 | www.mmmm.com | 2019-07-20 16:32:17 |

FIG. 11

| | First Browsing History Data 1200 | |
|---|---|---|
| No. | Set of URLs 1202 | Access time 1204 |
| 1 | www.aaaa.com | 2019-07-20 10:24:45 |
| 2 | www.cccc.com | 2019-07-20 14:10:15 |
| 3 | www.dddd.com | 2019-07-20 14:18:27 |
| 4 | www.ffff.com | 2019-07-20 17:21:51 |
| 5 | www.iiii.com | 2019-07-20 23:17:25 |
| 6 | www.jjjj.com | 2019-07-21 11:20:47 |
| 7 | www.llll.com | 2019-07-20 15:25:41 |
| 8 | www.mmmm.com | 2019-07-20 16:32:17 |

FIG. 12

| Second Browsing History Data 1300 | |
|---|---|
| Set of URLs 1302 | Access time 1304 |
| No. | | |
| 1 | www.bbbb.com | 2019-07-20 12:34:58 |
| 2 | www.hhhh.com | 2019-07-20 21:08:14 |
| 3 | www.eeee.com | 2019-07-20 15:11:19 |
| 4 | www.gggg.com | 2019-07-20 19:32:44 |
| 5 | www.kkkk.com | 2019-07-20 13:44:35 |
| 6 | www.llll.com | 2019-07-20 15:25:41 |
| 7 | www.mmmm.com | 2019-07-20 16:32:17 |

| No. | Delta Set 1400 | |
|---|---|---|
| | Set of URLs 1402 | Access time 1404 |
| 1 | www.aaaa.com | 2019-07-20 10:24:45 |
| 2 | www.cccc.com | 2019-07-20 14:10:15 |
| 3 | www.dddd.com | 2019-07-20 14:18:27 |
| 4 | www.ffff.com | 2019-07-20 17:21:51 |
| 5 | www.iiii.com | 2019-07-20 23:17:25 |
| 6 | www.jjjj.com | 2019-07-21 11:20:47 |
| 7 | www.llll.com | 2019-07-20 15:25:41 |
| 8 | www.mmmm.com | 2019-07-20 16:32:17 |

Rows 1–6: 1406
Rows 7–8: 1408

| Rank List 1500 | | |
|---|---|---|
| No. | Set of URLs 1502 | Proportion of users 1504 |
| 1 | www.iiii.com | 50 |
| 2 | www.fffff.com | 45 |
| 3 | www.dddd.com | 42 |
| 4 | www.cccc.com | 39 |
| 5 | www.mmmm.com | 25 |
| 6 | www.aaaa.com | 15 |
| 7 | www.llll.com | 10 |
| 8 | www.jjjj.com | 5 |

Rows 1–6: 1506
Rows 7–8: 1508

FIG. 15

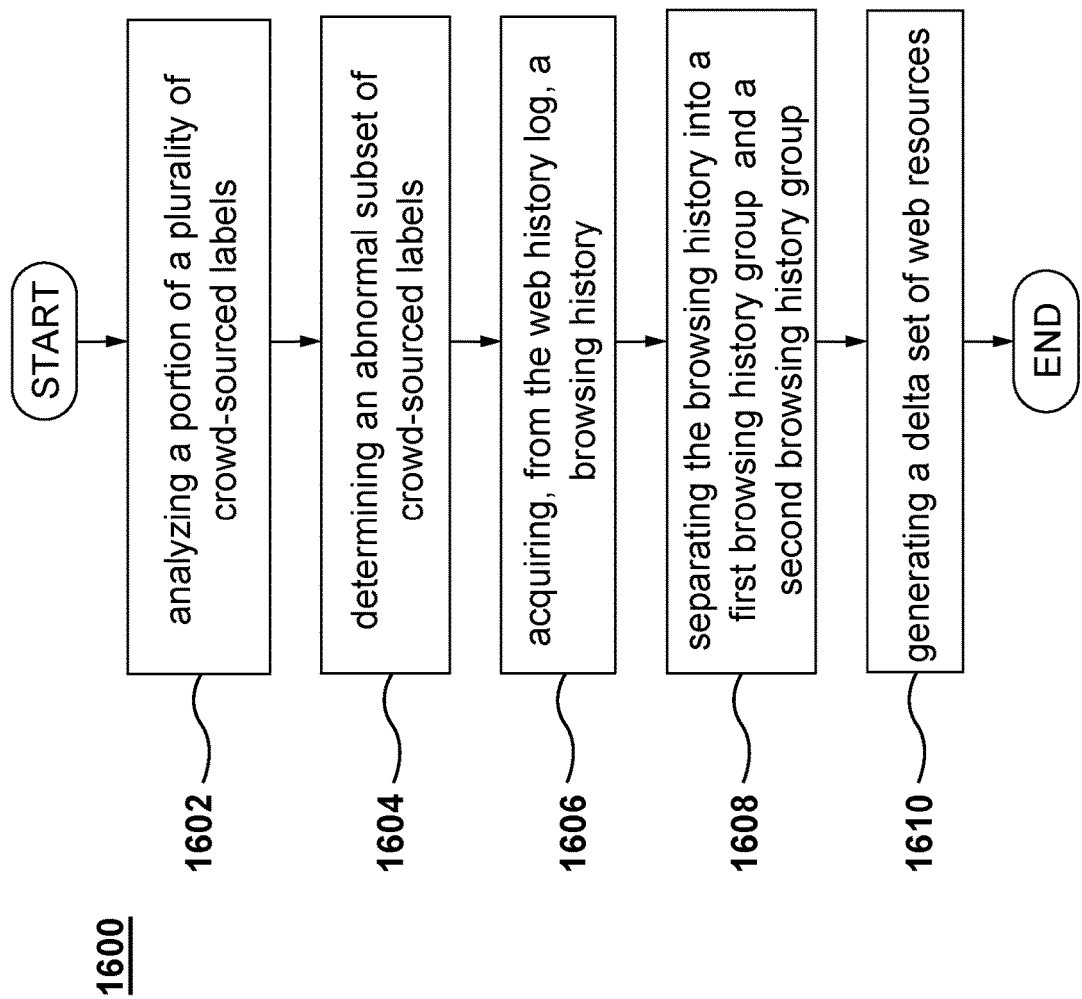

METHOD AND SYSTEM FOR DETERMINING ABNORMAL CROWD-SOURCED LABEL

CROSS-REFERENCE

The present application claims priority to Russian Patent Application No. 2019126515, entitled "Method and System for Determining Abnormal Crowd-Sourced Label", filed Aug. 22, 2019, the entirety of which is incorporated herein by reference.

FIELD

The present technology generally relates to methods and systems for determining of an abnormal crowd-sourced label, and, in particular, to methods and systems for detecting a source resulting in the abnormal crowd-sourced label.

BACKGROUND

Growing usability of the internet has given users an access to various web application services using a digital platform. Such web application services may include, but are not limited to, publications (e.g., music, books, movies, etc.), services airlines, hotels, restaurants, etc.). products (e.g., electronics, automobiles, kitchen ware, etc.), etc. Several web application services provide options to the users, where the users can publish contents corresponding to the web application services in a form of ratings, labels, likes, dislikes, comments, votes or the like. As an example, in a video content web application service, users may generate "labels" for various movies available for download or streaming from the service.

Web application service providers corresponding to the web application services may rank a digital item on such services based at least in part on the labels generated by the users. In certain scenarios, there may be a case where a part of the labels generated by the users contain fraudulent, untrue, misleading or incorrect labels. Some of these fraudulent labels may be generated by bots. Others can be generated by users that have been hired (paid) for such purposes.

However, there are some labels that may not be fraudulent but are "abnormal" or "incorrect". Broadly speaking, such labels are triggered by an external event. For example, consider a situation when a blogger has posted a scandalous review of a movie, which review has gone viral. There is a tendency for the users to start labelling the movie, based on the scandalous review and without watching the movie themselves.

Generally, there exist several computer-based methods for detecting and filtering fraudulent labels. For example, "U.S. Pat. No. 9,479,516 B2" discloses various ways to differentiate fraudulent submissions (e.g., ratings, comments, reviews, etc.) from legitimate submissions, e.g., submissions by real users of an application. These various ways may be used to generate intermediate signals that may indicate that a submission is fraudulent. One or more intermediate signals may be automatically combined or aggregated to generate a detection conclusion for a submission. Once a fraudulent submission is detected, the present disclosure describes various ways to proceed (e.g., either automatically or manually), for example, the fraudulent submission may be ignored, or a person or account associated with the fraudulent submission may be penalized. The various descriptions provided herein should be read broadly to encompass various other services that accept user ratings and/or comments.

"U.S. Pat. No. 10,089,660 B2" discloses multiple sources of reviews for the same product or service (e.g. hotels, restaurants, clinics, hair saloon, etc.) are utilized to provide a trustworthiness score. Such a score can clearly identify hotels with evidence of review manipulation, omission and fakery and provide the user with a comprehensive understanding of the reviews of a product or establishment. Three types of information are used in computing the score: spatial, temporal and network or graph-based. The information is blended to produce a representative set of features that can reliably produce the trustworthiness score. The invention is self-adapting to new reviews and sites. The invention also includes a validation mechanism by crowdsourcing and fake review generation to ensure reliability and trustworthiness of the scoring.

SUMMARY

Embodiments of the present technology have been developed based on developers' appreciation of at least one technical problem associated with the prior art solutions.

For example, even though the prior art solutions have merits and assist in detecting and filtering fraudulent labels corresponding to various web application services, it still presents certain shortcomings. For example, even though prior art discloses approaches to detecting and filtering fraudulent labels, there is still a need for detecting and filtering abnormal labels along with detecting a web source triggering the users to provide with incorrect labels in real time.

The present technology further arises from an observation made by the developer(s) that the web source may result in a "flash mob" providing incorrect labels, being triggered or influenced by the web source. Such flash mob may be resource intensive from the point of view of a server when the server has to handle a lot of incorrect labelling activities.

In developing the present technology, developers noted that a growing number of web application services being accessible by a browser application are serviced by web analytic services (such as Google Analytics™, and Yandex Metrica™, and the like). Briefly speaking, these web analytic services are configured to collect and store data associated with the browser application.

Without wishing to be bound to any specific theory, embodiments of the present technology have been developed based on an assumption that by assessing the browsing/navigational history of the users providing labels, an increased certainty, or confidence, that the label is or the label will be incorrect could be obtained.

In accordance with a first broad aspect of the present technology, there is provided a method of determining an abnormal crowd-sourced label for a digital item, the digital item accessible on a digital platform, the abnormal crowd-sourced label being one of a plurality of crowd-sourced labels having been assigned to the digital item by a plurality of users, the plurality of crowd-sourced labels being associated with a typical distribution of labels therein; the abnormal crowd-sourced label having been triggered by an external trigger event referencing the digital item but not associated with the digital item, the method executable by a server, the server storing a web history log associated with at least some of the plurality of users, the method comprising: analyzing a portion of the plurality of crowd-sourced labels collected over a period of time, determining an abnormal subset of crowd-sourced labels having been potentially caused by an occurrence of the external trigger event during the period of time, acquiring, from the web history log, a browsing history associated with a subset of the plurality of users having provided the portion of the plurality of crowd-sourced labels, separating the browsing history associated with the subset of the plurality of users into: a first browsing history group associated with the abnormal subset of crowd-sourced labels, a second browsing history group associated with a remainder of labels of the portion of the plurality of crowd-sourced labels, generating a delta set of web resources based on analyzing the first browsing history group and the second browsing history group for differences in web resources visited by a respective subset of the plurality of users, the delta set containing at least one web resource of the first browsing history set being associated with an abnormal pattern of visits, associating the at least one web resource as being a source of the external trigger event.

In some embodiments, the method further comprising identifying users of the plurality of users who have accessed the least one web resource during the period of time.

In some embodiments, the method further comprising discarding at least some labels in the plurality of labels from the users who have accessed the least one web resource during the period of time.

In some embodiments, the method further comprising assigning a lowering weight to at least some labels in the plurality of labels from the users who have accessed the at least one web resource during the period of time.

In some embodiments, the method further comprises, at a future period of time after the period of time: identifying a subset of users of a plurality of future users submitting labels at the future period of time who have accessed the least one web resource prior to the future period of time, executing one of: discarding labels of the subset of users of the plurality of future users, assigning a lowering weight to the labels of the subset of users of the plurality of future users.

In some embodiments of the method, wherein determining the abnormal subset comprises: analyzing spike trends between each neighbouring label in an actual label distribution in the portion of the plurality of crowd-sourced labels, based on the spike trends being misaligned with the typical distribution of labels determining the abnormal subset.

In some embodiments of the method, wherein the spike trends being misaligned with the typical distribution of labels is based on at least one of: a single set of two neighbouring labels being associated with an abnormal spike, two sets of consecutive neighbouring labels being associated with the abnormal spike.

In some embodiments of the method, wherein the single set of two neighbouring labels is one of a low label and a high label.

In some embodiments of the method, wherein the two sets of consecutive neighbouring labels are one of low labels and high labels.

In some embodiments of the method, wherein the method further comprises determining the abnormal pattern of visits.

In some embodiments of the method, wherein the determining the abnormal pattern of visits comprises: calculating a first proportion of users associated with the first browsing history group having accessed at least one web resource, calculating a second proportion of users associated with the second browsing history group having accessed at least one web resource, in response to the first proportion being larger than the second proportion, determining that the at least one web resource is associated with the abnormal pattern of visits.

In some embodiments, the method further comprising comparing the first proportion and the second proportion using a Z-statistics approach.

In some embodiments of the method, wherein in response to the Z-statistics approach indicating a statistically significant difference, determining the at least one web resource is the source of the external trigger event.

In some embodiments of the method, wherein the method further comprises ranking the at least one web resource into a ranked list using a proportion of the plurality of users who have viewed a given one of the at least one web resources.

In some embodiments, the method further comprising selecting a sub-set of the at least one web resource using an absolute number of the plurality of users who have viewed the given one of the at least one web resources as a cut-off threshold, the sub-set being the source of the external trigger event.

In some embodiments of the method, wherein the at least one web resource comprises a plurality of web resources, each hosting a respective version of the external trigger event.

In some embodiments of the method, wherein the digital item comprises content, and wherein the external trigger event is a review digital item containing a review of the content of the digital item.

In some embodiments of the method, wherein the review digital item is generated by an entity different from a source of the digital item.

In some embodiments, the method further comprising at a future point in time analyzing a browsing history of a user for present of the source of the external trigger event and in response to the present of the source of the external trigger event, taking a remedial action.

In some embodiments, the method further comprising based on the presence of the source of the external trigger event, analyzing crowd-sourced label generated by the user to validate that the source of the external trigger event is an actual source of the external trigger event.

In some embodiments of the method, wherein the source of the external trigger event is a plurality of sources of the external trigger event and wherein the method further comprises: selecting a top N-sources of the plurality of sources, training a Machine Learning Algorithm, using the top N-sources, to predict a top source of the external trigger event.

In some embodiments of the method, wherein the abnormal pattern of visits is representative of the at least one resource missing from the second browsing history.

In accordance with a second broad aspect of the present technology, there is provided a system for determining an abnormal crowd-sourced label for a digital item, the digital item accessible on a digital platform, the abnormal crowd-sourced label being one of a plurality of crowd-sourced labels having been assigned to the digital item by a plurality of users, the plurality of crowd-sourced labels being associated with a typical distribution of labels therein; the abnormal crowd-sourced label having been triggered by an external trigger event referencing the digital item but not associated with the digital item, the system comprises a server, the server storing a web history log associated with at least some of the plurality of users, the system further comprises: a processor, a non-transitory computer-readable medium comprising instructions, the processor, upon executing the instructions, being configured to cause the processor to: analyze a portion of the plurality of crowd-sourced labels collected over a period of time, determine an abnormal subset of crowd-sourced labels having been potentially caused by an occurrence of the external trigger event during the period of time, acquire, from the web history log, a browsing history associated with a subset of the plurality of users having provided the portion of the plurality of crowd-sourced labels, separate the browsing history associated with the subset of the plurality of users into: a first browsing history group associated with the abnormal subset of crowd-sourced labels, a second browsing history group associated with a remainder of labels of the portion of the plurality of crowd-sourced labels, generate a delta set of web resources based on analyzing the first browsing history group and the second browsing history group for differences in web resources visited by a respective subset of the plurality of users, the delta set containing at least one web resource of the first browsing history set being associated with an abnormal pattern of visits, associate the at least one web resource as being a source of the external trigger event.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "document" is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A page may correspond to a document or a portion of a document. Therefore, the words "page" and "document" may be used interchangeably in some cases. In other cases, a page may refer to a portion of a document, such as a sub-document. It may also be possible for a page to correspond to more than a single document.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

DESCRIPTION OF THE DRAWINGS

For a better understanding of the present technology, as well as other aspects and further features thereof, reference is made to the following description which is to be used in conjunction with the accompanying drawings, where:

FIG. 5 depicts an example of a typical distribution of labels corresponding to crowd-sourced labels and multiple users submitted the crowd-sourced labels, in accordance with various non-limiting embodiments of the present technology;

FIG. 11 depicts a schematic illustration of a browsing history data stored within a tracking server, in accordance with various non-limiting embodiments of the present technology;

FIG. 12 illustrates a first browsing history group associated with the users providing abnormal crowd-sourced labels, in accordance with various non-limiting embodiments of the present technology;

FIG. 13 illustrates the second browsing history group associated with remainder of the users of the portion of plurality of crowd-sourced labels, in accordance with various non-limiting embodiments of the present technology;

FIG. 14 depicts a delta set containing at least one web resource of the first browsing history set being associated with an abnormal pattern of visits, in accordance with various non-limiting embodiments of the present technology;

FIG. 15 depicts a rank list, generated by the abnormal crowd-sourced label processor containing a set of URLs, in accordance with various non-limiting embodiments of the present technology; and FIG. 16 illustrates a flowchart of a method for detecting an external trigger event, in accordance with various non-limiting embodiments of the present technology.

DETAILED DESCRIPTION

Figure 1:
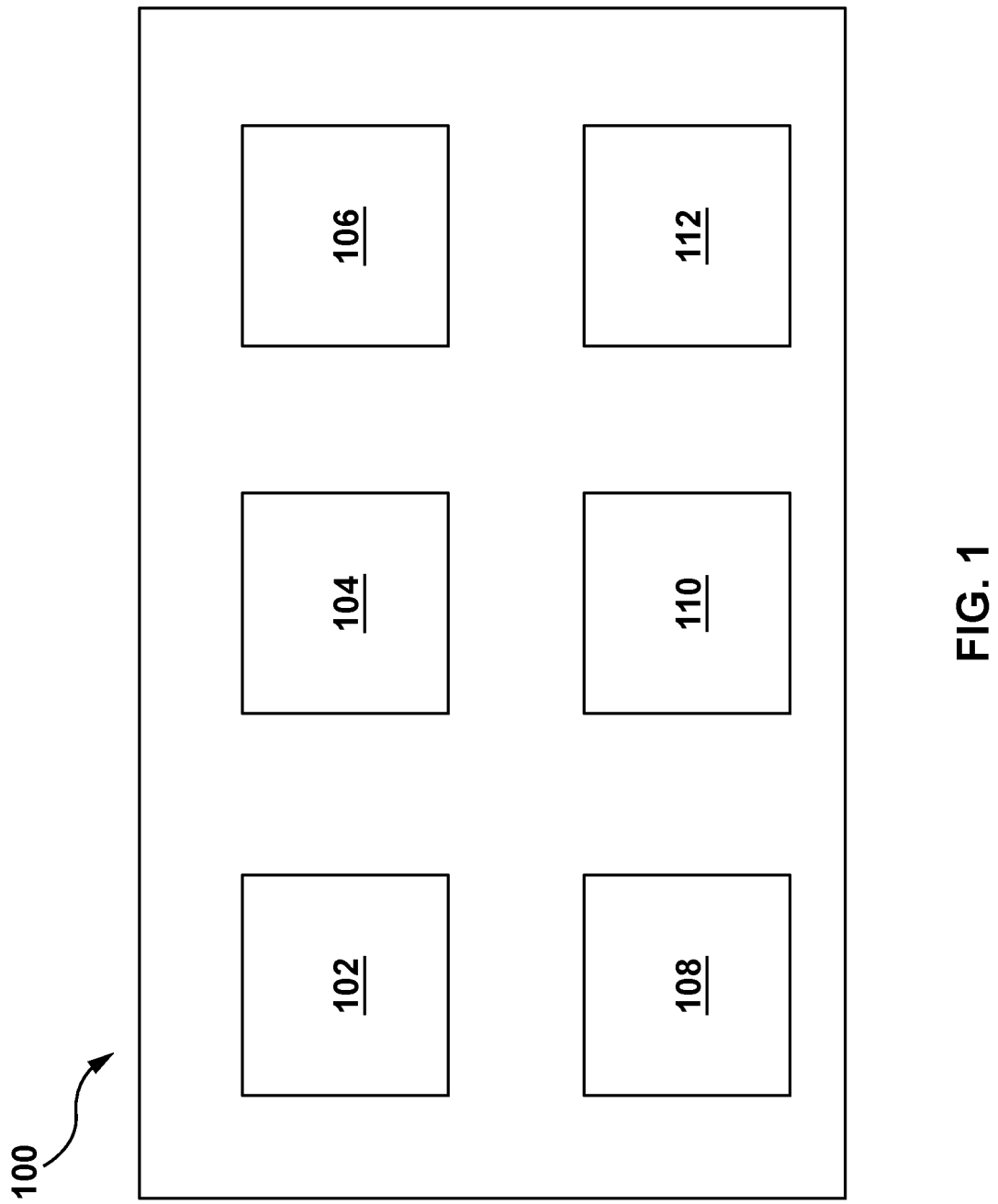
FIG. 1 is an illustration of various components and features of a client device implemented, in accordance with various non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

FIG. 1 illustrates various components and features of a client device 100 implemented in accordance with various non-limiting embodiments of the present technology. As shown, the client device 100 employs a processor 102, a graphic processing unit 104, a solid state drive 106, a memory 108, a display 110 and a network module 112. It will be understood that other elements may be present, but are not illustrated for the purpose of tractability and simplicity.

Communication between the various components of the client device 100 may be enabled by one or more internal and/or external buses (not Shown) such as, a PCI bus, universal serial bus, IEEE 1394 "Firewire" bus, SCSI bus, Serial-ATA bus, etc. to which the various hardware components are electronically coupled.

According to implementations of the present technology, the solid state drive 106 stores program instructions suitable for being loaded into the memory 108 and executed by the processor 102 and/or the GPU 104. For example, the program instructions may be part of a library or an application. By way of example, the memory 108 may be implemented as a computer-readable storage medium including Read-Only Memory (ROM), hard disk drives (HDDs), solid-state drives (SSDs), and flash-memory cards.

The client device 100 may be a server, a desktop computer, a laptop computer, a tablet, a smartphone, a personal digital assistant or any device that may be configured to implement the present technology, as should be understood by a person skilled in the art.

Figure 2:
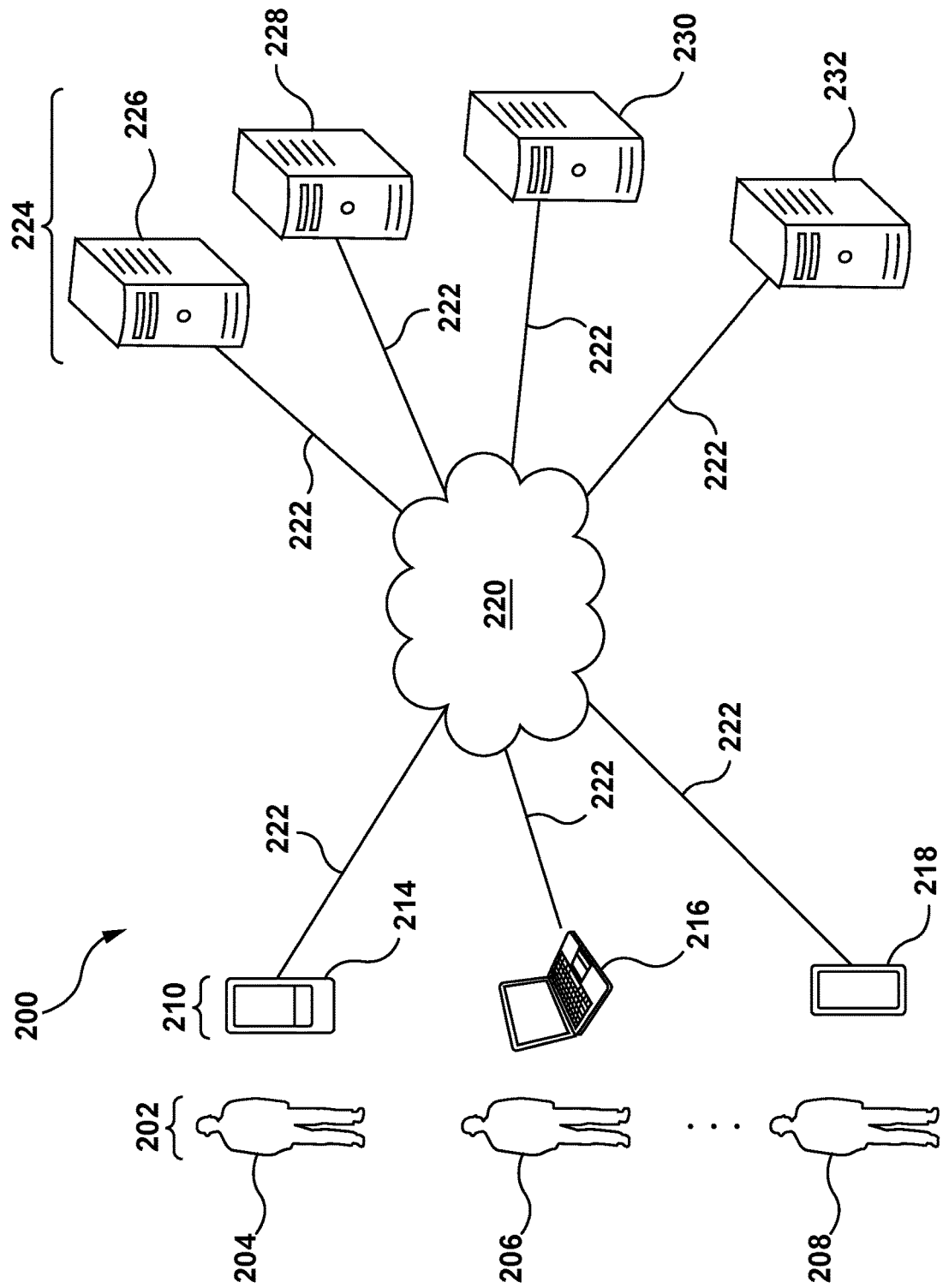
FIG. 2 is a schematic diagram depicting a system, the system being implemented in accordance with various non-limiting embodiments of the present technology.

FIG. 2 depicts a system 200, the system 200 being implemented in accordance with various non-limiting embodiments of the present technology. As shown, the system 200 comprises a plurality of users 202 being associated with a plurality of client devices 210. Depicted in FIG. 2 are: a first user 204, a second user 206, and a third user 208 are being respectively associated with a first client device 214, a second client device 216, and a third client device 218. In certain embodiments of current technology the first client device 214 may be implemented in a similar manner as the client device 100, the second client device 216 may be implemented as a laptop, and the third client device 218 may be implemented as a smart-phone. It should be noted that the fact that the plurality of users 202 being associated with a plurality of client devices 210 does not mean to suggest or imply any mode of operation—such as a need to log in, a need to be registered or the like.

Further, the plurality of client devices 210 are coupled to a communication network 220 via a respective communication link 222. It will be understood that the communication network 220 may be implemented using any suitable technologies such as internet, wide-area communications network, local-area communications networks, private communications network, etc.

How the communication link 222 is implemented is not particularly limited and will depend on how the first client device 214, the second client device 216 and the third client device 218 are implemented. Merely as an example and not as a limitation, in those embodiments of the present technology where at least one of the first client device 214, the second client device 216, and the third client device 218 is implemented as a wireless communication device (such as a smart-phone), the communication link 222 can be implemented as a wireless communication link (such as but not limited to, a 3G communications network link, a 4G communications network link, a Wireless Fidelity, or WiFi® for short, Bluetooth® and the like). In those examples, where at least one of the first client device 214, the second client device 216 and the third client device 218 is implemented as a notebook computer, the communication link 222 can be either wireless (such as the Wireless Fidelity, or WiFi® for short, Bluetooth® or the like) or wired (such as an Ethernet based connection).

It should be further understood that implementations for the first client device 214, the second client device 216 and the third client device 218, the communication network 220, and the communication link 222 are provided for illustration purposes only. As such, those skilled in the art will easily appreciate other specific implementational details for the first client device 214, the second client device 216, the third client device 218, the communication network 220, and the communication link 222. As such, by no means, examples provided herein above are meant to limit the scope of the present technology.

Further, the communication network 220 is also coupled to a plurality of servers 224. Depicted in FIG. 2 are a first application server 226, a second application server 228, a third application server 230 and a tracking server 232. The first application server 226, the second application server 228, the third application server 230, and the tracking server 232 can all be implemented as conventional computer servers. In certain embodiments of the present technology, the first application server 226, the second application server 228, the third application server 230, and the tracking server 232 can be implemented as a Dell™ PowerEdge™ Server running the Microsoft™ Windows Server™ operating system. By way of example, the plurality of servers may contain a tangible computer-readable storage medium including Read-Only Memory (ROM) and/or Random-Access Memory (RAM), one or more fixed storage devices in the form of, by way of example, hard disk drives (HDDs), solid-state drives (SSDs), and flash-memory cards.

Needless to say, the first application server 226, the second application server 228, the third application server 230, and the tracking server 232 can be implemented in any other suitable hardware and/or software and/or firmware or a combination thereof. Furthermore, the first application server 226, the second application server 228, the third application server 230, and the tracking server 232 can be implemented in different hardware or software there between.

In the depicted non-limiting embodiment of present technology, the first application server 226, the second application server 228, the third application server 230, and the tracking server 232 are each independent servers. In alternative non-limiting embodiments of the present technology, the functionality of each one of the first application server 226, the second application server 228, the third application server 230, and the tracking server 232 may be implemented on a single server or may be distributed and implemented on multiple servers (not depicted).

Figure 3:
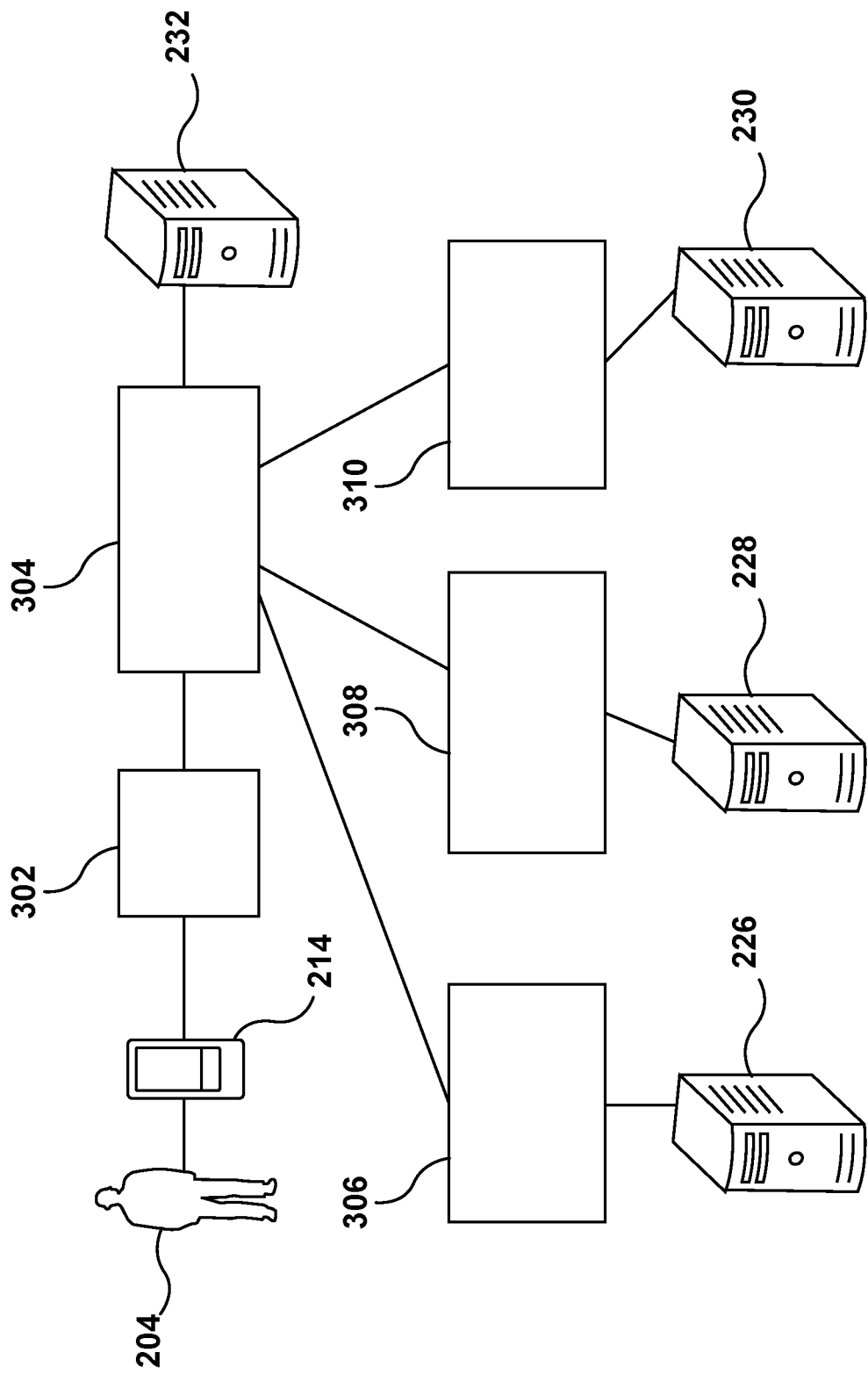
FIG. 3 is an illustration of web application services provided by a service provider implemented on the system of FIG. 2, in accordance with various non-limiting embodiments of the present technology.

FIG. 3 is an illustration of web application services provided by a web application service provider 304 implemented on the system 200 of FIG. 2 in accordance with various non-limiting embodiments of the present technology. A web application service provider 304 may provide a plurality of services, referred as web application services or application services, to the plurality of users 202 on the Internet. Examples of service providers include Yandex™, Google™ Yahoo™ online services and the like.

Generally, a user, such as the first user 204, may register for a user account 302 with the web application service provider 304 via his first client device 214, and access a plurality of services, such as social media application services 306 hosted on the first application server 226, a multi-media application services 308 hosted on the second application server 228 and other application services 310 hosted on the third application server 230 via a browser application (by accessing the website associated with the service) or a stand-alone application that can be executed on the first client device 214.

It will be appreciated that the social media application services 306 may include various social media platforms such as, Facebook™, Twitter™, Instagram™ online services and the like.

The multi-media application services 308 may include various multi-media platforms such as Youtube™ online service and the other application services 310 may include any other web application service available such as Amazon™, IMDb™, Playstore™, App Store™ online services etc.

The web application service provider 304 (and each one of the social media application services 306, the multi-media application services 308 and the other application services 310) may be connected to the tracking server 232. In other embodiments, the first user 204 may have registered with an email service (not shown), which may be associated with the web application service provider 304, and the web application service provider 304 may automatically create and link the user account 302 with the social media application services 306, the multi-media application services 308 and the other application services 310. In other non-limiting embodiments, the first user 204 may have registered with the email service and may have manually linked his accounts with the social media application services 306, the multi-media application services 308 and the other application services 310 (that may be associated with a different service provider) and authorized tracking of his user activity by the tracking server 232. The sharing of the user account 302 is typically done through a single sign-on application, such as Yandex.Passport™ or the like.

The web application service provider 304 may manage the tracking server 232, and the tracking server 232 may track user activities for each user (such as the plurality of users 202) associated with the plurality of services. However, in other embodiments, the functionality of the tracking server 232 may be implemented directly on at least one of the plurality of servers 224 such as, the first application server 226, the second application server 228 and the third application server 230 or directly on each one of the plurality of client devices 210 such as, the first user 204, the second user 206, and the third user 208.

As such, the tracking server 232 may receive every user interaction performed by a user, such as the first user 204, on an application service, such as each one of the social media application services 306, the multi-media application services 308 and the other application services 310 on his or her first client device 214 (or another client device the first user 204 may be using), and may maintain a log of user activity. How the tracking server 232 maintains a log of user activity is not limited and is well known in the art. As an example, each user interaction or user event received by the tracking server 232, directly from the client device 204 or from one of the first application server 226, the second application server 228 and the third application server 230, may be associated with an IP address, a device identifier, a time-stamp including the date, time, and time zone, a status, a content, and a score associated with the status. In at least some non-limiting embodiments of the present technology, the tracking server 232 may obfuscate the user identifier in order to protect private of the associated user, such as the first user 204.

With this said, in accordance with various non-limiting embodiments of the present technology, the plurality of users 202 may have access to various application services such as, the social media application services 306, the multi-media application services 308 and the other application services 310 and on at least one application service the plurality of users 202 may provide feedback or publish contents corresponding to a digital item 402 (discussed below) associated with the at least one application service in a form of ratings, labels, likes, dislikes, comments, votes or the like.

It will be appreciated that a digital item 402 (discussed below) can correspond to any digital document or resources, such as for example music, books, movies, airlines booking, hotels booking, restaurants, software, and the like, accessible on a digital platform such as, Facebook™, Twitter™, Instagram™, Youtube™, Amazon™, IMDb™, Playstore™, App Store™ online services and the like. As a non-limiting example, corresponding to a video content web application service, users may generate "labels" for various movies available for download or streaming from the service.

Based at least in part on the labels corresponding to the digital item 402 (discussed below), provided by the plurality of users 202, at least one of the plurality of servers 224 may be configured to rank the digital item 402 (discussed below). In certain scenarios, there may be a case where a portion of the labels provided by the plurality of users 202 contains "abnormal" or "incorrect" labels. Broadly speaking, in accordance with various non-limiting embodiments of the present technology, such labels are triggered by an external event. For example, consider a situation when a blogger has posted a scandalous review of a movie, which review has gone viral. There is a tendency for the users to start labelling the movie, based on the scandalous review and without watching the movie themselves.

Figure 4:
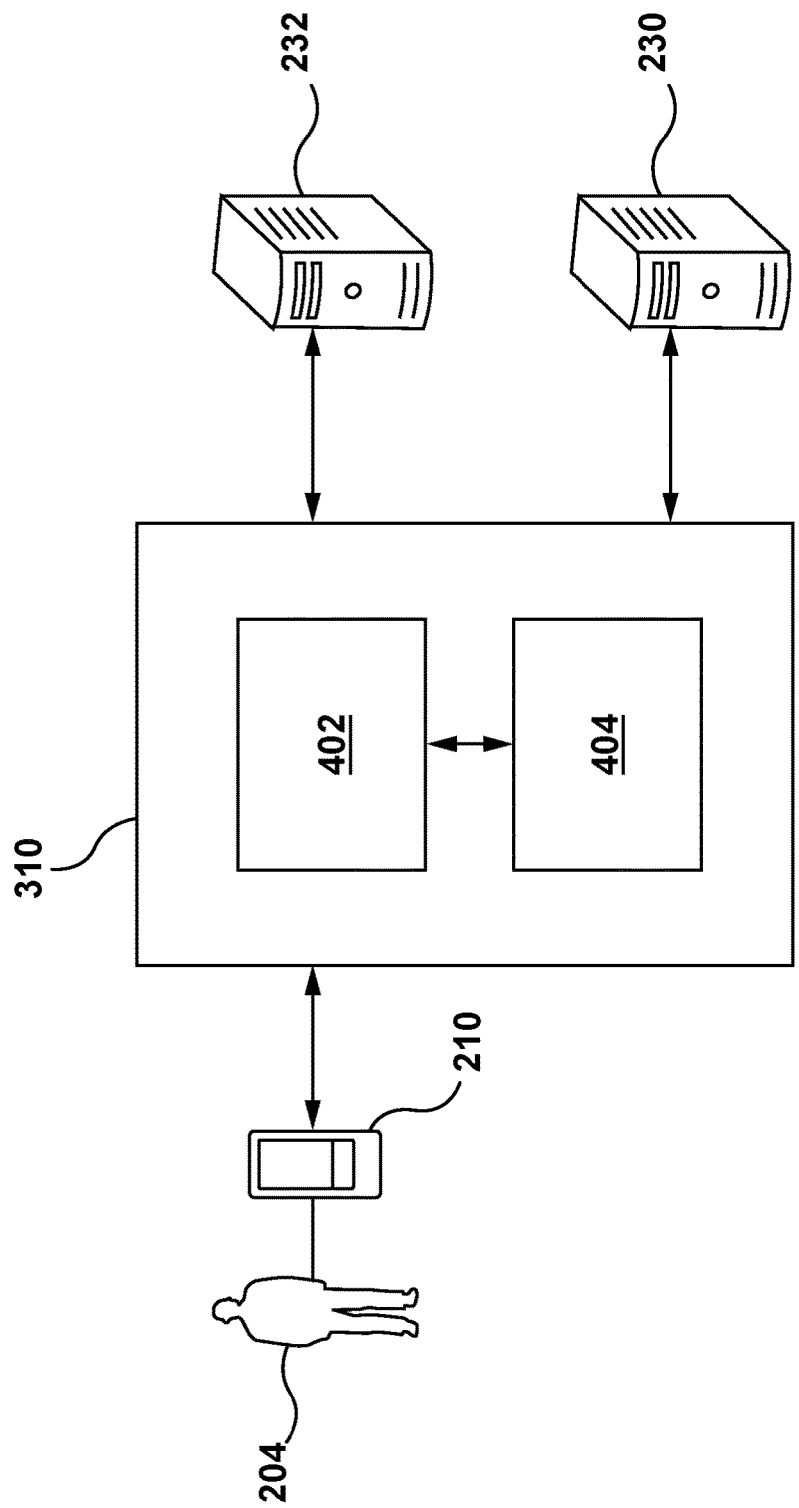
FIG. 4 illustrates a block diagram showing example components, modules, connections and interactions of an example application service, in accordance with various non-limiting embodiments of the present technology.

Hence, the requirement of detecting the source of external trigger event and the labels influenced by the source of the external trigger event becomes important for efficient functionality of system 200. To this end, FIG. 4 illustrates a block diagram showing example components, modules, connections and interactions of an example application service, according to various non-limiting embodiments of the present technology. As shown, the example illustrates the plurality of users 202 being associated with the plurality of client devices 210 who have access to the digital item 402 on the other application services 310.

The plurality of users 202 may access the digital item 402 on their associated client devices 210 through an interface associated with the other application services 310. The interface may be, for example, a webpage that may be viewed by a user via a web browser (e.g., a desktop browser or a mobile browser). As another example, the interface may be a mobile application that runs natively on at least one of the plurality of client devices 210. It is to be understood that the information associated with the digital item 402 may be stored in the third application server 230.

Further, the plurality of users 202 may have an option to submit a review, feedback, rating, comments, labels and the like to the corresponding digital item 402. Some of the non-limiting examples explaining the scenarios may include the plurality of users 202 providing ratings or comments corresponding to a movie, television programs, home videos, video games, streaming content online and the like on IMDB™ online service, or providing ratings or comments corresponding to various products (e.g., electronics, software, video games, apparel, furniture, food, toys, and jewelry, etc.) on Amazon™ online service, or the like.

It is to be understood that, in certain embodiments, the information associated with the digital item 402 may be stored in the third application server 230. Such information may include the digital contents (e.g. video, document, music and the like) associated with the digital item 402. Further, any review, feedback, rating, comments, labels and the like provided by the plurality of users 202 to the corresponding digital item 402 may also be stored in the second application server 228.

By means of a non-limiting example, FIG. 5 depicts an example of a typical distribution of labels 500 corresponding to crowd-sourced labels 502 and an indication of a number 504 of the crowd-sourced labels 502 having been submitted by at least some of the plurality of users 202, in accordance with various non-limiting embodiments of the present technology. It will be appreciated that the typical distribution of labels 500 is merely an example representing the distribution without any abnormality in the distribution of labels. That is, the typical distribution of labels 500 does not contain or contain a very small quantity of labels as provided by "flash mob users".

Further, the crowd-sourced labels 502 may also be some numbers selected from a pre-defined range. For example, a user rating may be [1-5] stars out of 5 stars, or a first number (integer or decimal) out of a second maximum integer. As an example, each increment (e.g., one integer) of the user rating may be indicated by some icon, such as a star. In some non-limiting embodiments of the present technology, the portion of the plurality of users 202 may submit the crowd-sourced labels 502 for a digital item 402, and based on the number 504 of the crowd-sourced labels 502, a ranking corresponding to the digital item 402 may be aggregated (e.g., averaged) to create an overall user ranking. For example, a number (integer or decimal) may be selected from a pre-defined range (e.g., 3.5 stars out of 5 stars).

Figure 6:
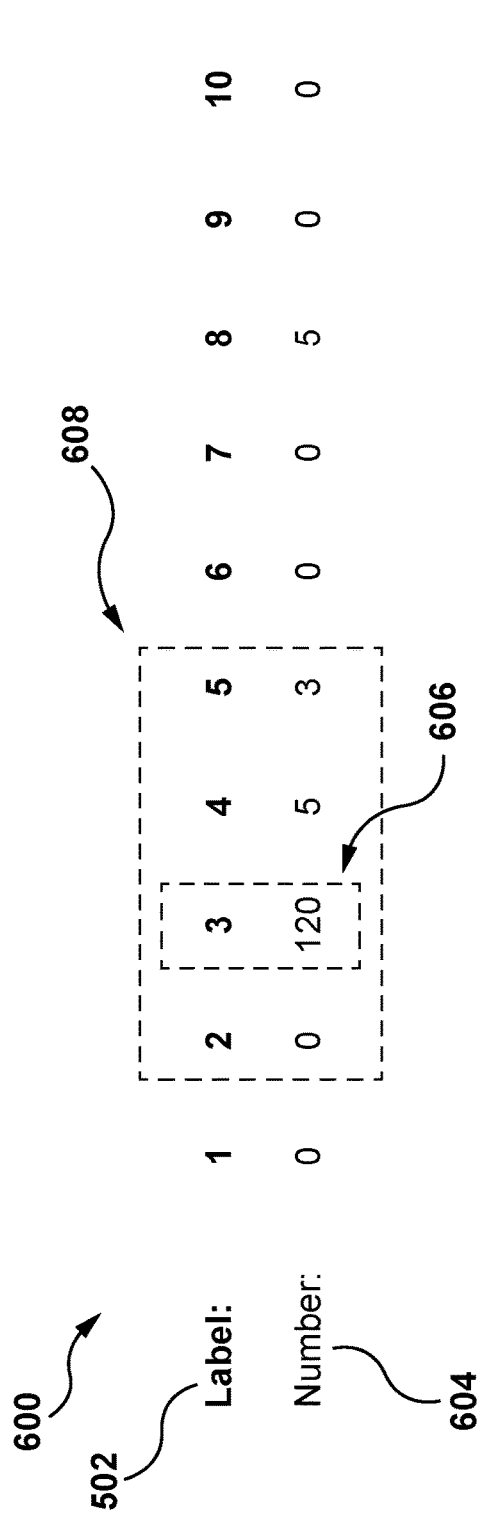
FIGS. 6-7 depict examples of actual label distributions where the crowd-sourced labels contain abnormal crowd-sourced labels, in accordance with various non-limiting embodiments of the present technology.
Figure 7:
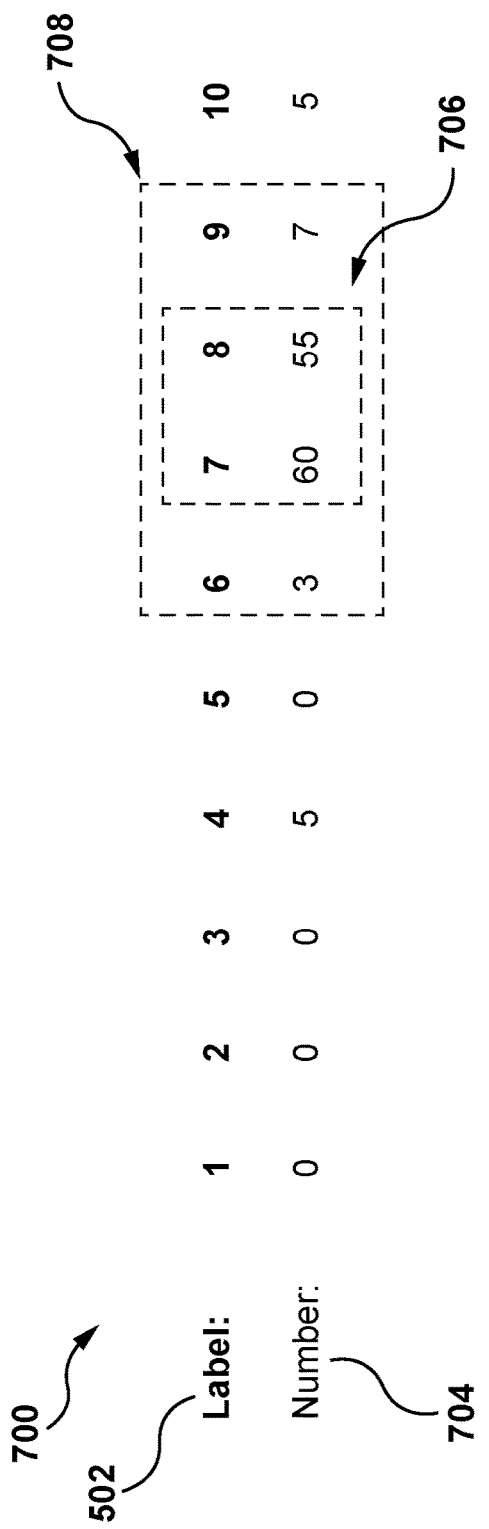

FIGS. 6-7 depict non-limiting examples of actual label distributions 600 and 700 based on a premise, that during the flash mob, an actual label distributions may be different from a typical distribution of labels with either a single crowd-sourced label will be having an abnormally high volume i.e. a single spike or two adjacent crowd-sourced labels will be having abnormally high volumes i.e. a joint spike. Depicted in FIG. 6 is the first scenario, where the crowd-sourced labels 502 contain a single abnormal crowd-sourced label 606 provided by a number 604 an indication of the crowd-sourced labels 502 having been submitted by at least some of the plurality of users 202 and FIG. 7 depicts the second scenario the crowd-sourced labels 502 containing a set of two abnormal crowd-sourced labels 706 provided by a number 704 an indication of the crowd-sourced labels 502 having been submitted by at least some of the plurality of users 202.

It will be appreciated that the abnormal crowd-sourced labels 606 and 706 may be influenced by the source of the external trigger event. For example, consider a situation when a blogger has posted a scandalous review of a movie, which review has gone viral. There is a tendency for at least some of the plurality of users 202 to start labelling the movie, based on the scandalous review and without watching the movie themselves. Similarly, based on a video corresponding to a product or a service (e.g. electronics, hotel, restaurants and the like) gone viral on a social media platform and the at least some of the plurality of users 202 start labelling without actually using the product or the service. Such abnormal or incorrect crowd-sourced labelling may result in flash mobs. Returning to FIG. 4, the other application services 310 may further employs an abnormal crowd-sourced label processor 404. The abnormal crowd-sourced label processor 404 may be configured to receive, analyze and process the crowd-sourced labels 502 provided by the plurality of users 202. In so doing, the abnormal crowd-sourced label processor 404 determines the abnormal subset in the crowd-sourced labels, such as, abnormal crowd-sourced labels 606 or 706. Based on a browsing history data 1100 (described below) associated with a portion of the users 202 providing portion of crowd-sourced labels 502 (e.g. 608 or 708) or an entirety of the crowd-sourced labels 502, abnormal crowd-sourced label processor 404 generates a delta set 1400 (described below) containing at least one web resource being the source of source of the external trigger event.

In accordance with various non-limiting embodiments of the present technology, the delta set 1400 represents at least one web resource associated with abnormal browsing pattern (i.e. an abnormal pattern of visits).

In some non-limiting embodiments of the present technology, the abnormal pattern of visits can be indicative of the at least one resource missing from the second browsing history. Alternatively, the abnormal pattern of visits can be indicative of the visits to the at least one resource present in the second browsing history being disproportionately higher than visits in the first browsing history. It is noted that an exact value for "disproportionately higher" can be determined for a specific implementation of the non-limiting embodiments of the present technology and can be set based on experimental results of the non-limiting embodiments of the present technology. For example, the value of the disproportionally higher can be ten-fold. It is noted that the lower the value, the lower the freehold is to be considered as a candidate for the source of the external trigger event is.

Figure 8:
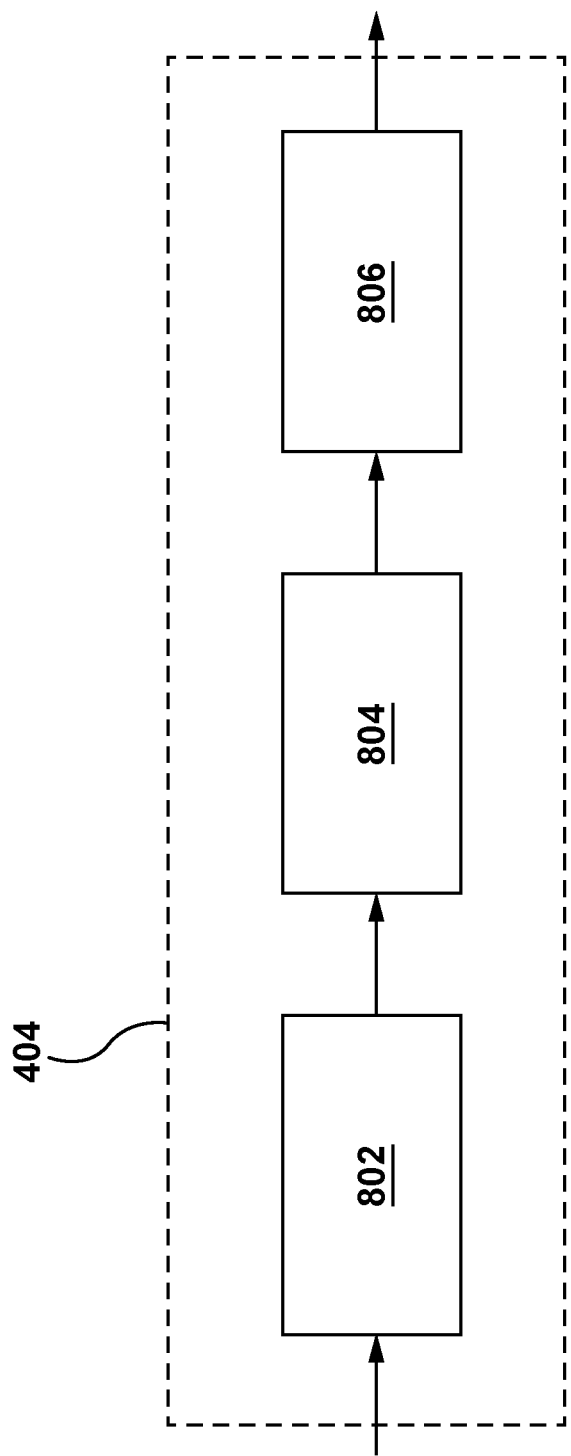
FIG. 8 illustrates a detailed high-level functional block diagram of an abnormal crowd-sourced label processor, in accordance with various non-limiting embodiments of the present technology.

With this said, FIG. 8 illustrates a detailed high-level functional block diagram of the abnormal crowd-sourced label processor 404, in accordance with various non-limiting embodiments of the present technology. As shown, the abnormal crowd-sourced label processor 404 employs an initial label analyzer 802, a browsing history analyzer 804, and a final label analyzer 806. It will be understood that other elements may be present, but are not illustrated merely for the purpose of simplicity.

In accordance with at least one non-limiting embodiment of the present technology, the abnormal crowd-sourced label processor 404 receives the crowd-sourced labels 502 assigned to the digital item 402 by at least some of the plurality of users 202. In certain embodiments, the crowd-sourced labels 502 may be stored in the third application server 230 and the abnormal crowd-sourced label processor 404 retrieves the crowd-sourced labels 502 from the third application server 230. In some other non-limiting embodiments of the present technology, the other application services 310 may provide the crowd-sourced labels 502 directly to the abnormal crowd-sourced label processor 404 before storing them in the third application server 230. The abnormal crowd-sourced label processor 404 then supplies the crowd-sourced labels 502 to the initial label analyzer 802.

Figure 9:
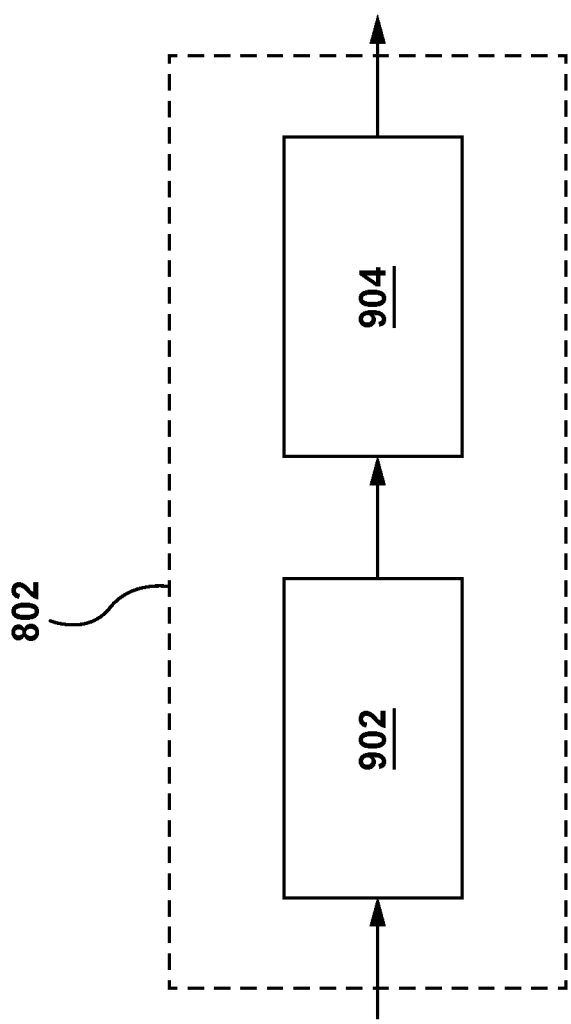
FIG. 9 illustrates a detailed high-level functional block diagram of an initial label analyzer, in accordance with various non-limiting embodiments of the present technology.

The initial label analyzer 802 may be configured to analyze a spike trend in the crowd-sourced labels 502 in order to select the abnormal subset in the crowd-sourced labels, such as, the abnormal crowd-sourced labels 606 or 706. To this end, FIG. 9 illustrates a detailed high-level functional block diagram of the initial label analyzer 802, in accordance with various non-limiting embodiments of the present technology. As shown, the initial label analyzer 802 employs a spike trend analyzer 902 and an abnormal subset selector 904. It will be understood that other elements may be present, but are not illustrated merely for the purpose of simplicity.

The spike trend analyzer 902 receives the crowd-sourced labels 502 and may be configured to analyze a portion of plurality of crowd-sourced labels 502 (e.g. 608 or 708) in the actual label distribution (e.g. actual label distributions 600 or 700) or an entirety of the crowd-sourced labels 502, over a period of time, in order to detect spikes in the concentration of labels in the actual label distribution with respect to adjacent labels. In certain embodiments, the portion of plurality of crowd-sourced labels 502 (e.g. 608 or 708) in the actual label distribution (e.g. actual label distributions 600 or 700) may be associated with either low labels or high labels.

As such, the spike trend analyzer 902 may apply a sliding time window, terminating at the present moment and over the labels submitted for a predetermined period of time T. Further, the predetermined period of time T may be based on saturation of concentration of labels submitted the given period of time. By means of a non-limiting example, consider scenarios with 10 labels submitted a day versus 10000 labels submitted a day. In the first scenario, the value predetermined period of time T might be in days resulting in a longer sliding time window as compare to the sliding window in the second scenario where the value of predetermined period of time T might be in hours.

In certain non-limiting embodiments of the present technology, in order to detect such spikes, the spike trend analyzer 902 may be implemented as a classifier, such as, a binary classifier configured to render a "yes" or a "no" prediction. The spike trend analyzer 902 may be trained using two targets, the single spike and the joint spike. Particularly, the two metrics associated with the two targets are:

Concentration in the same label, such as abnormal crowd-sourced label 606, with spiked behaviour on both ends thereof;

Concentration around several labels, such as abnormal crowd-sourced label 706, with spiked behaviour on both ends thereof;

In certain embodiments, in order to compute the two features (the single spike factor and the joint spike), the spike trend analyzer 902 may calculate difference in values (DIVs) between the concentration of labels in two neighbouring labels in the crowd-sourced labels 502. The spike trend analyzer 902 then normalizes the DIVs and ranks the normalized DIVs. The spike trend analyzer 902 then selects the top normalized DIVs as the first feature i.e. the single spike factor or, if present, top two normalized DIVs associated with consecutive neighbouring labels as the second feature i.e. the joint spike factor.

Consider the following TABLE 1 as a non-limiting example of a label distribution on a scale of 1 to 5 without "flash mob":

TABLE 1

| Labels | 1 | 2 | 3 | 4 | 5 |
|---|---|---|---|---|---|
| Proportion of each label | 15% | 20% | 25% | 22% | 14% |
| DIVs |  | 5% | 5% | 3% | 8% |
| Normalized DIVs |  | 27.77% | 27.77% | 16.67% | 44.44% |

As shown, TABLE 1 corresponds to labels, proportion of each label (in %), DIVs (in %), and normalized DIVs (in %). The spike trend analyzer 902 may compute DIVs by taking the difference in proportion of each adjacent label. The spike trend analyzer 902 then computes the normalized DIVs on a scale of 100%. Based on the normalized DIVs pattern being "usual" with respect to each other or "abnormally high" for a particular normalized DIV with respect to other normalized DIVs, the spike trend analyzer 902 may determine that the label distribution is a typical label distribution or an actual label distribution with a "flash mob", which in this case is determined as the typical label distribution (i.e. one without the "flash mob".

Consider the following TABLE 2 as another non-limiting example of a label distribution on a scale of 1 to 5 with the "Flash Mob":

TABLE 2

| Labels | 1 | 2 | 3 | 4 | 5 |
|---|---|---|---|---|---|
| Proportion of each label | 60% | 30% | 5% | 3% | 2% |
| DIVs |  | 30% | 25% | 2% | 1% |
| Normalized DIVs |  | 51.72% | 43.10% | 3.48% | 1.72% |

As shown, TABLE 2 corresponds to labels, proportion of each label (in %), DIVs (in %), and normalized DIVs (in %). The spike trend analyzer 902 may compute DIVs by taking the difference in proportion of each adjacent label. The spike trend analyzer 902 then computes the normalized DIVs on a scale of 100%. In this example, there are a couple of normalized DIVs abnormally higher than other normalized DIVs. To this end, the spike trend analyzer 902 may further be configured to select the top normalized DIV as the first feature (e.g. 51.72% in this case) and top two normalized DIV as the second feature (e.g. 51.72% and 43.10% in this case).

It is noted that an exact value for "abnormally higher" can be determined for a specific implementation of the non-limiting embodiments of the present technology and can be set based on experimental results of the non-limiting embodiments of the present technology. For example, the value of the abnormally higher can be ten-fold.

Based on spike trend analyzed, in the portion of plurality of crowd-sourced labels 502 (e.g. 608 or 708) or in the entirety of the crowd-sourced labels 502, by the spike trend analyzer 902, the abnormal subset selector 904 determines which subsets of crowd sourced labels are being misaligned with the typical distribution of labels (e.g. typical distribution of labels 500).

Depending on the implementation, the misalignment of the subsets of crowd sourced labels with the typical distribution of labels may be based on a single set of two neighbouring labels being associated with an abnormal spike in concentration of labels (the single spike factor) or two sets of consecutive neighbouring labels being associates with abnormal spike in concentration of labels (the joint spike factor). Furthermore, the single spike factor or the joint spike factor is typically associated with one of a low label and a high label and the two set of two neighbouring labels are one of low labels and high labels. Using an example of a scale of 1 to 10, the low label be either 1 or 2; while the high label can be either 9 or 10. However, the exact definition of what is considered to be low label and what is considered to be high level can be selected by the operator of the spike trend analyzer 902. Broadly speaking, the premise of the selection of the low or high labels is that "flash mob" types of labels tend to be either highly positive or highly negative.

Returning to FIG. 8, once the abnormal subset of crowd-sourced labels 502 is determined by the abnormal subset selector 904, the abnormal subset of crowd-sourced labels 502 is then supplied to the browsing history analyzer 804 for further processing. The browsing history analyzer 804 may be configured to analyze the browsing history data 1100 (described below) associated with a portion of the users 202 providing the portion of plurality of crowd-sourced labels 502 (e.g. 608 or 708) or an entirety of the crowd-sourced labels 502 and generate the delta set 1400 (described below) containing at least one web resource being the source of source of the external trigger event.

Figure 10:
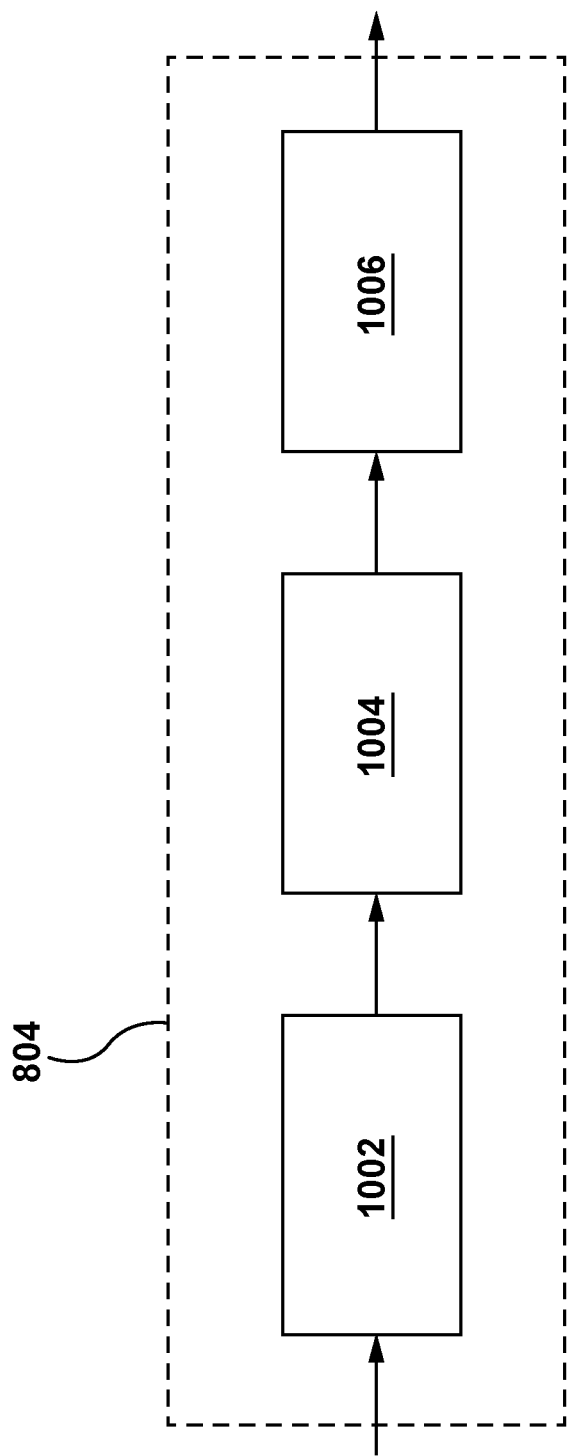
FIG. 10 illustrates a detailed high-level functional block diagram of a browsing history analyzer, in accordance with various non-limiting embodiments of the present technology.

Depicted in FIG. 10 is a detailed high-level functional block diagram of the browsing history analyzer 804, in accordance with various non-limiting embodiments of the present technology. As illustrated, the browsing history analyzer 804 employs a browsing history acquirer 1002, a browsing history parser 1004 and a delta set generator 1006. It will be understood that other elements may be present, but are not illustrated for the purpose of tractability and simplicity.

The browsing history acquirer 1002 is configured to acquire the browsing history data 1100 (described below) associated with the portion of the users 202 providing the portion of plurality of crowd-sourced labels 502 (e.g. 608 or 708) or an entirety of the crowd-sourced labels 502 from a web history log associated with the plurality of users 202 stored in the tracking server 232. How the tracking server 232 maintains a log of user activity is not limited and is well known in the art. As an example, each user interaction or user event received by the tracking server 232, directly from the plurality of client devices 210 or from one of the first application server 226, the second application server 228, and the third application server 230, may be associated with an IP address, a device identifier, a timestamp including the date, time, and time zone, a status, a content, and the like.

With reference to FIG. 11, there is provided a non-limiting example of the browsing history data 1100 associated with the portion of the users 202 providing the portion of plurality of crowd-sourced labels 502 (e.g. 608 or 708) or an entirety of the crowd-sourced labels 502 in the form of an index stored within the tracking server 232. The browsing history data 1100 consists of a set of universal resource locators (URLs) 1102 and a corresponding access time 1104 for each URL in the set of URLs 1102. The set of URLs 1102 can be sorted chronologically based on the respective access time 1104. Although the browsing history data 1100 is depicted as only comprising the set of URLs 1102 and the access time 1104, it is not limited as such, and may further include other information, such as an IP address, a device identifier, a timestamp including the date, time, and time zone, a status, and the like.

It will be appreciated that the set of URLs 1102 are merely non-limiting examples based on user activities performed on different application services such as social media application services 306 hosted on the first application server 226, a multi-media application services 308 hosted on the second application server 228 and other application services 310 hosted on the third application server 230.

The browsing history acquirer 1002 then supplies the browsing history data 1100 to the browsing history parser 1004 for further processing. The browsing history parser 1004 is configured to separate the browsing history data 1100 into a first browsing history group 1200 (described below) associated with the users providing abnormal crowd-sourced labels (e.g. abnormal crowd-sourced labels 606 or 706) and a second browsing history group 1300 (described below) associated with a remainder of the users of the portion of plurality of crowd-sourced labels 502.

FIG. 12 illustrates the first browsing history group 1200 associated with the users providing abnormal crowd-sourced labels (e.g. abnormal crowd-sourced labels 606 or 706), in accordance with various non-limiting embodiments of the present technology. The first browsing history group 1200 consists of a set of URLs 1202, which is a subset of the set of URLs 1102 and a corresponding access time 1204 for each URL in the set of URLs 1202. The set of URLs 1202 are sorted chronologically based on the respective access time 1204.

FIG. 13 illustrates the second browsing history group 1300 associated with the remainder of the users of the portion of plurality of crowd-sourced labels 502, in accordance with various non-limiting embodiments of the present technology. The first browsing history group 1200 consists of a set of URLs 1302, which is a subset of the set of URLs 1102 and a corresponding access time 1304 for each URL in the set of URLs 1302. The set of URLs 1302 are sorted chronologically based on the respective access time 1304.

The browsing history parser 1004 then supplies the first browsing history group 1200 and the second browsing history group 1300 to the delta set generator 1006 for further processing. The delta set generator 1006 is configured to analyze the first browsing history group 1200 and the second browsing history group 1300 and to generate a delta set 1400 (described below). The delta set 1400 (described below) is generated based on a difference in web resources associated with the first browsing history group 1200 and the second browsing history group 1300 (set of URLs 1202 and 1302) visited by the portion of the users 202 providing the portion of plurality of crowd-sourced labels 502 (e.g. 608 or 708) or an entirety of the crowd-sourced labels 502.

Depicted by FIG. 14 is the delta set 1400 generated by the browsing history parser 1004, the delta set 1400 containing at least one web resource of the first browsing history set being associated with an abnormal pattern of visits, in accordance with various non-limiting embodiments of the present technology. The delta set 1400 consists of a set of URLs 1402, which is a subset of the set of URLs 1102 and a corresponding access time 1404 for each URL in the set of URLs 1402. The set of URLs 1402 are sorted chronologically based on the respective access time 1404.

In some non-limiting embodiments of the present technology, the set of URLs 1402 further contain a subset of URLs 1406 and a subset of URLs 1408. The subset of URLs 1406 may be associated with the web resource of the first browsing history group 1200 being absent in the second browsing history group 1300 and contain at least one web resource as being a source of the external trigger event (e.g. www.aaaa.com or www.cccc.com or both). In certain embodiments the subset of URLs 1408 may be associated with the web resources common in both the first browsing history group 1200 and the second browsing history group 1300 (e.g. www.llll.com or www.mmmm.com or both). However, the proportion of users associated with the first browsing history group 1200 accessed the subset of URLs 1408 is larger than the proportion of the second browsing history group 1300 accessed the subset of URLs 1408.

It will be appreciated that the at least one web resource, such as the subset of URLs 1406 or 1408 may comprise a plurality of web resources, each hosting a respective version of the external trigger event (e.g. blogs, social media posts, news and the like) and each external trigger event may be a review of the content of the digital item 402. Further, the review associated with the digital item 402 may be generated by an entity different from the digital item 402. Such entities may include bloggers, reviewers, spammers or any random users not associated with the digital item 402.

In certain non-limiting embodiments of the present technology, the delta set generator 1006 further analyze the set of URLs 1102 associated with the browsing history data 1100. For each URL in the set of URLs 1102, the delta set generator 1006 may compute a number of users have accessed that URL. Further, using a Z-statistics approach indicating a statistically significant difference in the number of users being associated with the first browsing history group 1200 accessing a URL in the set of URLs 1102 as compared to the number of users being associated with the second browsing history group 1300 accessing the same URL in the set of URLs 1102, the delta set generator 1006 may identify the URLs (e.g. www.gggg.com or www.kkkk.com) as the at least one web resource as being the source of the external trigger event and are stored in delta set 1400 as the subset of URLs 1408.

Returning to FIG. 8, the browsing history analyzer 804 provides the delta set 1400 to the final label analyzer 806 for further processing. The final label analyzer 806 may identify the users of the plurality of users 202 who have accessed the at least one web resource during the predetermined period of time T. In certain embodiments, final label analyzer 806 may discard some of the labels or at least assign a lowering weight to some of the labels in crowd-sourced labels 502 provided from the users of the plurality of users 202 who have accessed the at least one web resource during the predetermined period of time T. By this means the final label analyzer 806 assist the abnormal crowd-sourced label processor 404 in improving the authenticity of crowd-sourced labels 502.

Returning to FIG. 4, in certain non-limiting embodiments of present technology, the abnormal crowd-sourced label processor 404 may communicate with the third application server 230 and the tracking server 232 to identify a subset of plurality of users 202 who have already accessed the at least one web resource but have not provided a corresponding label to the digital item 402. There is a high probability that the labels provided by such users at the future period of time will be biased. To this end, the abnormal crowd-sourced label processor 404 may further discard such labels or at least provide a lowering weight to such labels at a future period of time.

In certain non-limiting embodiments of the present technology, the abnormal crowd-sourced label processor 404 may also communicate with the third application server 230 and the tracking server 232 to keep a track on a browsing history of a future user accessing the at least one web resource at the future period of time and in response to the presence of the source of the external trigger event, the abnormal crowd-sourced label processor 404 takes a remedial action. Such remedial action may include discarding any labels provided by the future users or at least providing a lowering weight to any labels provided by future users at the future period of time. Further, in certain embodiments, based on the presence of the source of the external trigger event, the abnormal crowd-sourced label processor 404 may analyze a crow-sourced label generated by the future user to validate that the source of the external trigger event is an actual source of the external trigger event.

In certain non-limiting embodiments of the present technology, where the at least one web resources comprises a plurality of web resources that have been determined as candidates for the source of the external trigger event, the abnormal crowd-sourced label processor 404 may be configured to rank the at least one web resource into a rank list 1500 (described below) using a proportion of the plurality of users 202 who have viewed a given one of the at least one web resources.

Depicted in FIG. 15 is the rank list 1500, generated by the abnormal crowd-sourced label processor 404 containing a set of URLs 1502 associated with the at least one web resource and a proportion of users 1504 of the plurality of users 202 who have viewed a given one of the at least one web resources. For example, the URL www.iiii.com is being viewed by 50 users, the URL www.ffff.com is being viewed by 45 users and so on. Further, the abnormal crowd-sourced label processor 404 may be configured to select a subset (e.g. 1506) of the at least one web resource using an absolute number of proportion of users 1504 as a cut-off threshold for a low frequency subset (e.g. 1508) viewed by the proportion of users 1504.

In certain non-limiting embodiments of the present technology, the abnormal crowd-sourced label processor 404 may further employ a machine learning algorithm (MLA) having been trained to predict a top source of the external trigger event based on top N-sources of the plurality of sources of the external trigger event.

It will be appreciated that although the abnormal crowd-sourced label processor 404 is shown as a separate module, however, in accordance with various non-limiting embodiments of the present technology, the functionality of the abnormal crowd-sourced label processor 404 may be implemented on any one or all of the first application server 226, the second application server 228, the third application server 230, the tracking server 232.

Now turning to FIG. 16, a flowchart of a method 1600 for detecting an external trigger event is illustrated, in accordance with various non-limiting embodiments of the present technology.

In some non-limiting embodiments of the present technology, the method 1600 may be executed for a single service, the other application services 310. In other embodiments, the method 1600 may be executed for a plurality of services, such as the social media application services 306, multi-media application services 308 and the other application services 310. The method 1600 being executable in accordance with non-limiting embodiments of the present technology. The method 1600 may be executed by the third application server 230 and start at step 1602.

Step 1602: Analyzing a Portion of a Plurality of Crowd-Sourced Label.

At step 1602 the spike trend analyzer 902 receives crowd-sourced labels 502 and analyzes a portion of the plurality of crowd-sourced labels 502 or an entirety of the crowd-sourced labels 502, over a period of time.

Step 1604: Determining an Abnormal Subset of Crowd-Sourced Labels.

At step 1604, the abnormal subset selector 904 determines an abnormal subset of crowd-sourced labels, based on spike trend analyzed, in the portion of plurality of crowd-sourced labels 502 or in the entirety of the crowd-sourced labels 502, by the spike trend analyzer 902.

Step 1606: Acquiring, from the Web History Log, a Browsing History.

At step 1606, the browsing history acquirer 1002 acquire the browsing history data 1100 associated with the portion of the users 202 providing the portion of plurality of crowd-sourced labels 502 or an entirety of the crowd-sourced labels 502 from a web history log associated with the plurality of users 202 stored in the tracking server 232.

Step 1608: Separating the Browsing History into a First Browsing History Group and a Second Browsing History Group.

At step 1608, the browsing history parser 1004 separates the browsing history data 1100 into a first browsing history group 1200 associated with the users providing abnormal crowd-sourced labels and a second browsing history group 1300 associated with a remainder of the users of the portion of plurality of crowd-sourced labels 502.

Step 1610: Generating a Delta Set of Web Resources.

At step 1610, the delta set generator 1006 analyzes the first browsing history group 1200 and the second browsing history group 1300 to generate a delta set 1400. The delta set 1400 is generated based on the difference in web resources associated with the first browsing history group 1200 and the second browsing history group 1300 visited by the portion of the users 202 providing the portion of plurality of crowd-sourced labels 502 or an entirety of the crowd-sourced labels 502. The delta set contains at least one web resource of the first browsing history set being associated with an abnormal pattern of visits and the at least one web resource being associated as a source of the external trigger event It should be apparent to those skilled in the art that at least some embodiments of the present technology aim to expand a range of technical solutions for addressing a particular technical problem, namely decreasing the computational burden imposed on various servers by decreasing the abnormal label activities that are performed over the communication network, which is believed to improve network traffic and reduce the burden on network servers. It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Modifications and improvements to the above-described implementations of the present technology may become apparent to those skilled in the art. The foregoing description is indented to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A method of determining an abnormal crowd-sourced label for a digital item, the digital item accessible on a digital platform, the abnormal crowd-sourced label being one of a plurality of crowd-sourced labels having been assigned to the digital item by a plurality of users, the plurality of crowd-sourced labels being associated with a typical distribution of labels therein; the abnormal crowd-sourced label having been triggered by an external trigger event referencing the digital item but not associated with the digital item, the method executable by a server, the server storing a web history log associated with at least some of the plurality of users, the method comprising:
analyzing a portion of the plurality of crowd-sourced labels collected over a period of time;
determining an abnormal subset of crowd-sourced labels having been potentially caused by an occurrence of the external trigger event during the period of time;
acquiring, from the web history log, a browsing history associated with a subset of the plurality of users having provided the portion of the plurality of crowd-sourced labels;
separating the browsing history associated with the subset of the plurality of users into:
a first browsing history group associated with the abnormal subset of crowd-sourced labels;
a second browsing history group associated with a remainder of labels of the portion of the plurality of crowd-sourced labels;
generating a delta set of web resources based on analyzing the first browsing history group and the second browsing history group for differences in web resources visited by a respective subset of the plurality of users, the delta set containing at least one web resource of the first browsing history set being associated with an abnormal pattern of visits;
associating the at least one web resource as being a source of the external trigger event.

2. The method of claim 1, further comprising identifying users of the plurality of users who have accessed the least one web resource during the period of time.

3. The method of claim 2, further comprising discarding at least some labels in the plurality of labels from the users who have accessed the least one web resource during the period of time.

4. The method of claim 2, further comprising assigning a lowering weight to at least some labels in the plurality of labels from the users who have accessed the at least one web resource during the period of time.

5. The method of claim 1, wherein the method further comprises, at a future period of time after the period of time:
identifying a subset of users of a plurality of future users submitting labels at the future period of time who have accessed the least one web resource prior to the future period of time;
executing one of:
discarding labels of the subset of users of the plurality of future users;
assigning a lowering weight to the labels of the subset of users of the plurality of future users.

6. The method of claim 1, wherein determining the abnormal subset comprises:
analyzing spike trends between each neighbouring label in an actual label distribution in the portion of the plurality of crowd-sourced labels;
based on the spike trends being misaligned with the typical distribution of labels determining the abnormal subset.

7. The method of claim 6, wherein the spike trends being misaligned with the typical distribution of labels is based on at least one of:
a single set of two neighbouring labels being associated with an abnormal spike;
two sets of consecutive neighbouring labels being associated with the abnormal spike.

8. The method of claim 7, wherein the single set of two neighbouring labels is one of a low label and a high label.

9. The method of claim 7, wherein the two sets of consecutive neighbouring labels are one of low labels and high labels.

10. The method of claim 1, wherein the method further comprises determining the abnormal pattern of visits.

11. The method of claim 10, wherein the determining the abnormal pattern of visits comprises:
calculating a first proportion of users associated with the first browsing history group having accessed at least one web resource;

calculating a second proportion of users associated with the second browsing history group having accessed at least one web resource;

in response to the first proportion being larger than the second proportion, determining that the at least one web resource is associated with the abnormal pattern of visits.

12. The method of claim 11, further comprising comparing the first proportion and the second proportion using a Z-statistics approach.

13. The methods of claim 12, wherein in response to the Z-statistics approach indicating a statistically significant difference, determining the at least one web resource is the source of the external trigger event.

14. The method of claim 13, wherein the method further comprises ranking the at least one web resource into a ranked list using a proportion of the plurality of users who have viewed a given one of the at least one web resources.

15. The method of claim 14, further comprising selecting a sub-set of the at least one web resource using an absolute number of the plurality of users who have viewed the given one of the at least one web resources as a cut-off threshold, the sub-set being the source of the external trigger event.

16. The method of claim 1, wherein the digital item comprises content, and wherein the external trigger event is a review digital item containing a review of the content of the digital item.

17. The method of claim 1, further comprising at a future point in time analyzing a browsing history of a user for present of the source of the external trigger event and in response to the present of the source of the external trigger event, taking a remedial action.

18. The method of claim 17, further comprising based on the presence of the source of the external trigger event, analyzing crowd-sourced label generated by the user to validate that the source of the external trigger event is an actual source of the external trigger event.

19. The method of claim 1, wherein the source of the external trigger event is a plurality of sources of the external trigger event and wherein the method further comprises:
selecting a top N-sources of the plurality of sources;
training a Machine Learning Algorithm, using the top N-sources, to predict a top source of the external trigger event.

20. A system for determining an abnormal crowd-sourced label for a digital item, the digital item accessible on a digital platform, the abnormal crowd-sourced label being one of a plurality of crowd-sourced labels having been assigned to the digital item by a plurality of users, the plurality of crowd-sourced labels being associated with a typical distribution of labels therein; the abnormal crowd-sourced label having been triggered by an external trigger event referencing the digital item but not associated with the digital item, the system comprises a server, the server storing a web history log associated with at least some of the plurality of users, the system further comprises:
a processor;
a non-transitory computer-readable medium comprising instructions, the processor;
upon executing the instructions, being configured to cause the processor to:
analyze a portion of the plurality of crowd-sourced labels collected over a period of time;
determine an abnormal subset of crowd-sourced labels having been potentially caused by an occurrence of the external trigger event during the period of time;
acquire, from the web history log, a browsing history associated with a subset of the plurality of users having provided the portion of the plurality of crowd-sourced labels;
separate the browsing history associated with the subset of the plurality of users into:
a first browsing history group associated with the abnormal subset of crowd-sourced labels;
a second browsing history group associated with a remainder of labels of the portion of the plurality of crowd-sourced labels;
generate a delta set of web resources based on analyzing the first browsing history group and the second browsing history group for differences in web resources visited by a respective subset of the plurality of users, the delta set containing at least one web resource of the first browsing history set being associated with an abnormal pattern of visits;
associate the at least one web resource as being a source of the external trigger event.

* * * * *